US012338664B2

(12) United States Patent
Louda

(10) Patent No.: US 12,338,664 B2
(45) Date of Patent: Jun. 24, 2025

(54) MOTOR VEHICLE LOCK, IN PARTICULAR MOTOR VEHICLE DOOR LOCK

(71) Applicant: Kiekert AG, Heiligenhaus (DE)

(72) Inventor: Zbynek Louda, Pardubice (DO)

(73) Assignee: Kiekert AG, Heiligenhaus (DE)

( * ) Notice: Subject to any disclaimer, the term of this patent is extended or adjusted under 35 U.S.C. 154(b) by 125 days.

(21) Appl. No.: 18/245,398

(22) PCT Filed: Aug. 25, 2021

(86) PCT No.: PCT/DE2021/100714

§ 371 (c)(1),
(2) Date: Mar. 15, 2023

(87) PCT Pub. No.: WO2022/057975

PCT Pub. Date: Mar. 24, 2022

(65) Prior Publication Data

US 2023/0349203 A1 Nov. 2, 2023

(30) Foreign Application Priority Data

Sep. 15, 2020 (DE) ..................... 10 2020 123 948.3

(51) Int. Cl.
*E05B 85/26* (2014.01)
*E05B 15/04* (2006.01)
*E05B 81/14* (2014.01)

(52) U.S. Cl.
CPC .............. *E05B 81/15* (2013.01); *E05B 85/26* (2013.01); *E05B 2015/041* (2013.01)

(58) Field of Classification Search
CPC ........ E05B 81/15; E05B 85/24; E05B 85/243; E05B 85/26; E05B 2015/041
See application file for complete search history.

(56) References Cited

U.S. PATENT DOCUMENTS 6,109,671 A 8/2000 Roncin et al.
2015/0308161 A1* 10/2015 Rosales .................. E05B 85/26 292/195

FOREIGN PATENT DOCUMENTS

CN 108798309 A * 11/2018
CN 108798310 A * 11/2018
DE 19650661 A1 * 6/1998 ............. E05B 77/30
DE 10043574 A1 11/2001
DE 102007056251 A1 * 1/2009 ............. E05B 81/66
DE 102018120435 A1 * 2/2020

(Continued)

OTHER PUBLICATIONS

Computer Generated Translation for DE 10043574 A1, Generated on Feb. 7, 2025, https://worldwide.espacenet.com/ (Year: 2025).*

(Continued)

*Primary Examiner* — Alyson M Merlino

(74) *Attorney, Agent, or Firm* — Renner, Otto, Boisselle & Sklar, LLP

(57) ABSTRACT

A motor vehicle lock, in particular a motor vehicle door lock, which in its basic design is equipped with a locking mechanism consisting essentially of a rotary latch and a pawl. In addition, an accumulator lever that is controllable by the rotary latch is realized, which temporarily holds the pawl in its open position (accumulator position) at least during an opening process of the locking mechanism. According to the invention, a common spring acting on the rotary latch and the accumulator lever is provided.

15 Claims, 3 Drawing Sheets

(56) References Cited

FOREIGN PATENT DOCUMENTS

| | | | | |
|---|---|---|---|---|
| DE | 102018128420 A1 * | 5/2020 | ............. | E05B 15/04 |
| EP | 1669526 A2 * | 6/2006 | ............. | E05B 81/14 |
| EP | 2434077 A1 * | 3/2012 | ............. | E05B 81/14 |
| WO | 2015062578 A2 | 5/2015 | | |

OTHER PUBLICATIONS

International Search Report mailed Dec. 3, 2021, for priority International Patent Application No. PCT/DE2021/100714.

* cited by examiner

MOTOR VEHICLE LOCK, IN PARTICULAR MOTOR VEHICLE DOOR LOCK

This application is a national phase of International Patent Application No. PCT/DE2021/100714 filed Aug. 25, 2021, which claims priority to German Patent Application No. 10 2020 123 948.3 filed Sep. 15, 2020, each of which is hereby incorporated herein by reference in its entirety.

FIELD OF DISCLOSURE

The invention relates to a motor vehicle lock, in particular a motor vehicle door lock, comprising a locking mechanism consisting essentially of a rotary latch and pawl, and an accumulator lever which can be controlled by the rotary latch and temporarily holds the pawl in its open position (accumulator position) at least during an opening process of the locking mechanism.

BACKGROUND OF DISCLOSURE

A motor vehicle lock of the type described at the beginning is generally equipped with an additional release lever, with whose help the locking mechanism can be opened. For this purpose, the release lever acts on the pawl and lifts it from its position latching with the rotary latch. Since the motor vehicle lock in question and in particular the motor vehicle door lock is typically mounted on a motor vehicle door, motor vehicle hinged component or even on a motor vehicle hood, the motor vehicle door, motor vehicle hinged component or even on the motor vehicle hood in question can be opened in this way. This is because in this process a locking bolt previously caught by the locking mechanism and which is connected to the motor vehicle door, motor vehicle hinged component or motor vehicle hood in question is released. In the open position or accumulator position of the pawl, with the aid of the accumulator lever the pawl is prevented from locking with the rotary latch.

Such situations can occur in practice when, for example, opening is hindered by a snow load on a bonnet or tailgate. In such a case, the release lever still ensures that the pawl is lifted out of its latching engagement with the rotary latch. The rotary latch then opens in a spring-assisted manner and/or by the spring force built up with the aid of circumferential rubber seals. However, due to the snow load, it can happen that after completion of application of the release lever the pawl undesirably engages in a pre-ratchet (or also in a main ratchet) and thus prevents a complete opening. This is because this has the consequence of the locking bolt not being released. In this case, the accumulator lever ensures that the open position of the pawl is stored or the pawl is regularly held in its open position until the rotary latch is fully open and consequently an undesired latching of the pawl is prevented. As a result, the locking bolt and with it the motor vehicle door, motor vehicle hinged component or motor vehicle hood are definitely released.

For this purpose, the generic prior art according to WO 2015/062578 A2 makes use of an accumulator lever which is designed as a spring. As a result, a reliable opening is to be provided even in the event of interference from, for example, the snow load previously mentioned.

In another and similarly constructed teaching according to DE 10 2018 120 435 A1, a so-called two-pawl locking mechanism with a comfort pawl and a pawl securing the comfort pawl at least in the closed position of the locking mechanism is to realized. With the aid of the accumulator lever, the comfort pawl is held open at least during a closing operation of the locking mechanism until the comfort pawl can securely engage the rotary latch after its release by the accumulator lever. To do so, the accumulator lever interacts directly with the comfort pawl.

The prior art in particular according to the generic WO 2015/062578 A2 has proven itself in principle. However, in practice accumulator levers designed as a spring are confronted with two basic problems. On the one hand, the spring effect of the accumulator lever can decrease due to ageing or due to environmental loads. On the other hand, the spring effect set is not optimally adapted to all conceivable scenarios which occur in practice, in particular with regard to the control of various loads. This is where the invention comes in.

SUMMARY OF DISCLOSURE

The invention is based on the technical problem of further developing a motor vehicle lock of the structure described at the beginning in such a way that flawless functionality is provided with at the same time an optimized design of the structure.

To solve this technical problem, a generic motor vehicle lock and in particular a motor vehicle door lock is characterized within the scope of the invention by a common spring acting on the rotary latch and the accumulator lever being provided.

The invention therefore initially assumes that the accumulator lever—in contrast to the prior art according to WO 2015/062578 A2—has a rigid design and consequently requires an additional spring. This spring ultimately ensures that the accumulator lever can be controlled perfectly by the rotary latch.

For this purpose, the rotary latch generally operates on the accumulator lever with the aid of a control stop controlling the accumulator lever. This typically only happens only when and not until the rotary latch has assumed its fully open position and consequently the pawl cannot (any longer) latch with the rotary latch. In this case, the rotary latch with its control stop controlling the accumulator lever ensures that the accumulator position is released.

For this purpose, the control stop on the rotary latch can interact with a control projection on the accumulator lever in order to release the accumulator position. As a result of this, the accumulator lever pivots upwards relative to the pawl and the pawl is not (any longer) held in its open position or accumulator position. Following this, the pawl generally rests on the now open rotary latch in a spring-supported manner. In this case, there is expressly no latching with the rotary latch because the accumulator position is not released until the rotary latch has assumed its fully open or almost fully open position. Only then does the described interaction occur between the control stop on the rotary latch and the control projection on the accumulator lever.

So that this interaction between the control stop on the rotary latch and the control projection on the accumulator lever takes place flawlessly and when the fully or almost fully open position of the rotary latch is reached, the spring in question which is acting on the accumulator lever ensures the corresponding abutment and guidance of the control projection on the accumulator lever relative to the control stop on the rotary latch.

In addition to this, as it were, first spring function of the common spring, which according to the invention acts on the rotary latch and the accumulator lever, this spring also assumes a further second spring function. This is because the common spring in question ensures at the same time that the rotary latch is acted upon in the direction of its open position with the aid of the common spring. In other words, according to the invention, the previously described first spring function and the second spring function are taken over by the common spring acting on the rotary latch and the accumulator lever.

In order to achieve and implement this in detail, the spring in question which acts jointly on the rotary latch and the accumulator lever is designed as a leg spring. The leg spring has a wound section and two spring legs. Here, the spring is regularly connected by its wound section to the rotary latch. In fact, the wound section is typically arranged concentrically in relation to an axis of the rotary latch.

Here, the one of the two spring legs of the leg spring is usually designed as a rotary latch spring leg acting on the rotary latch. In contrast, the other and second spring leg is usually an accumulator lever spring leg acting on the accumulator lever. In addition, the design is such that the respective spring leg rests against a rotary latch stop or an accumulator lever stop. That is to say, the rotary latch spring leg consequently rests against the rotary latch stop, whereas the accumulator lever spring leg rests against the accumulator lever stop.

Furthermore, the design is such that the rotary latch spring leg rests against the rotary latch stop predominantly radially in relation to the axis of the rotary latch. As a result, with the aid of the rotary latch spring leg a largely tangential force can be exerted on the likewise radially oriented rotary latch stop with the aid of the rotary latch spring leg. As a result of this, the rotary latch is acted upon with a spring force which is predominantly perpendicular to the radial direction in relation to the axis of the rotary latch and accordingly optimally generates a torque exerted on the rotary latch in relation to its axis. This is ensured by the rotary latch spring leg of the common spring, which predominantly radially rests against the rotary latch stop in relation to the axis of the rotary latch. At the same time, a relatively large torque can thereby be exerted on the rotary latch with the aid of the common spring, specifically in its opening direction.

By contrast, the accumulator lever spring leg rests against the accumulator lever stop mostly tangentially in relation to the axis of the rotary latch. As a result, the accumulator lever acts on its accumulator lever stop with a spring force that is significantly less in comparison to the rotary latch spring leg. Consequently, the force built up by the accumulator lever spring leg on the accumulator lever stop ensures that the accumulator lever with the previously mentioned control projection is held in contact with the control stop on the rotary latch. A slight force is sufficient for this purpose.

Finally, the rotary latch and the accumulator lever and also the pawl are typically mounted in a housing so as to be rotatable about axes spaced apart in each case. The housing can be a lock housing. In addition, the design is usually such that the three axes spaced apart from each other run predominantly parallel to each other. As a result, in the housing or lock housing in question the rotary latch, the pawl and the accumulator lever are rotatably mounted at a distance from one another and, as described, the interaction of the accumulator lever with the rotary latch can occur as soon as the rotary latch has reached its fully or almost fully open position. This is because the control stop on the rotary latch ensures that the accumulator lever is lifted by its control projection from its engagement with the pawl and consequently the pawl gives up its previously stored open position, forcibly assumed with the aid of the accumulator lever. The pawl is then applied with the spring force to the fully or almost fully open rotary latch and cannot (any longer) latch with it.

As a result, a motor vehicle lock is provided which first of all works in a particularly functionally reliable and ageing-resistant manner. Given the rigid design of the accumulator lever, its functionality and the required functional reliability are provided even on long time scales. At the same time, the accumulator lever spring leg of the common spring ensures that the rotary latch can correctly control the accumulator lever, in particular in its open or fully open position it ensures that the accumulator position is released.

In addition to this described and faultless functional activity, a structurally particularly simple design with cost advantages is also realized. This is explained on the basis of the fact that the separate spring previously used in the prior art for the rotary latch, on the one hand, and for the accumulator lever, on the other hand, is replaced according to the invention by the common spring acting on the rotary latch and the accumulator lever. This not only reduces production costs but also simplifies assembly. Herein lie the essential advantages.

BRIEF DESCRIPTION OF DRAWINGS

The invention is explained in greater detail below with reference to drawings which show only one exemplary embodiment. In the drawings.

DETAILED DESCRIPTION

Figure 1:
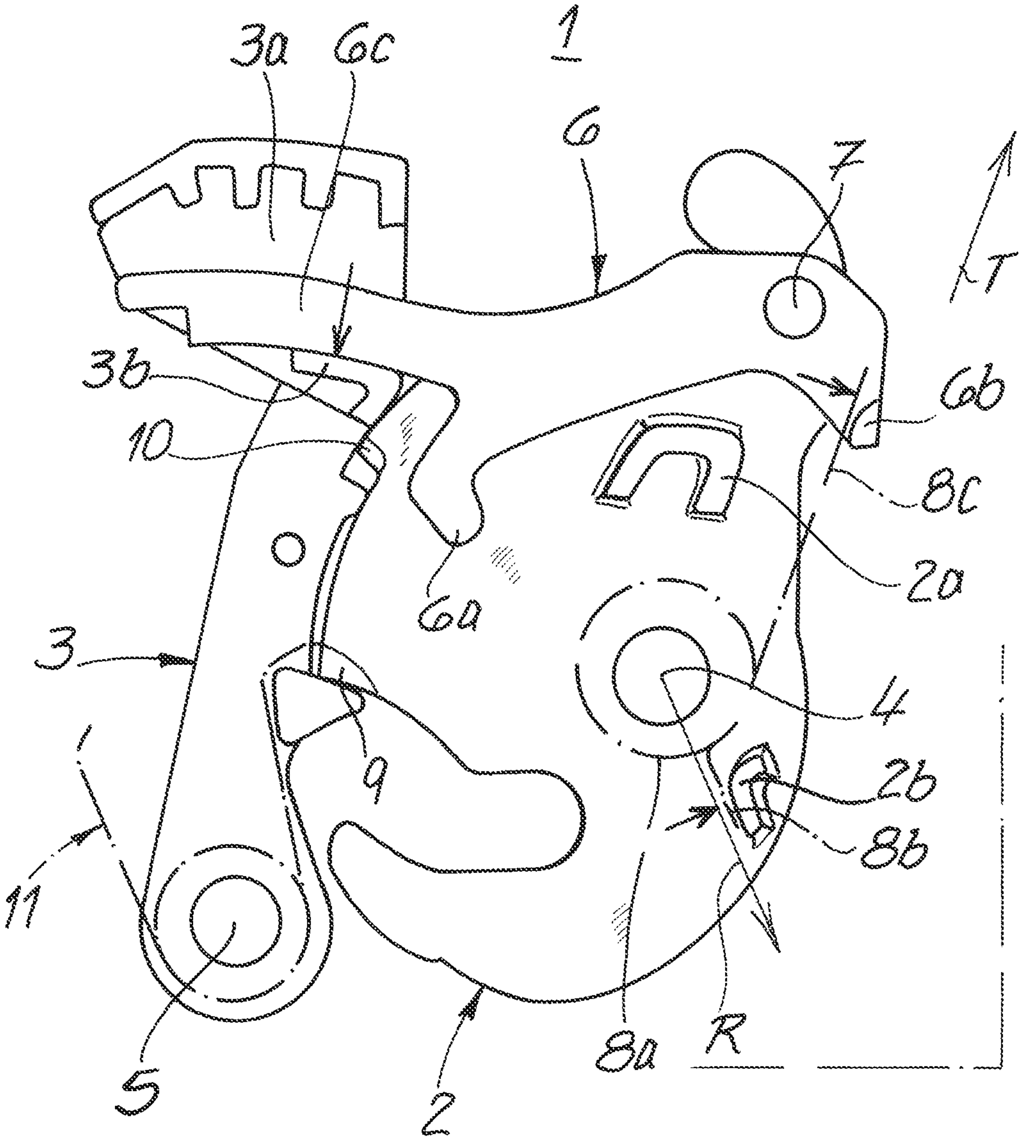
FIG. 1 shows the motor vehicle lock according to the invention with its essential elements in the closed position.

The drawings show a motor vehicle lock which is not limited to a motor vehicle door lock. First of all, this has a lock housing 1 which, in a non-limiting manner, may be a lock case 1, which is merely indicated, and/or a housing (made of plastic) that additionally houses the lock case 1. A locking mechanism 2, 3 consisting of a rotary latch 2 and a pawl 3 is mounted in the lock case 1. For this purpose, the rotary latch 2 and the pawl 3 each have an associated rotary latch axis 4 or pawl axis 5. The two axes 4, 5 are largely oriented parallel and spaced apart from one another and, according to the exemplary embodiment, run perpendicularly in relation to the lock case 1 oriented in the drawing plane.

In addition, an accumulator lever 6 which can be controlled by the rotary latch 2 is also provided. The accumulator lever 6 is also mounted rotatably about an axis 7, which runs perpendicular to the lock case 1 and largely parallel to and spaced apart from the two axes 4, 5. In contrast to the rotary latch 2 and pawl 3, the accumulator lever 6 can be mounted in the previously mentioned housing (made of plastic) or even on the lock case 1.

As already explained, the accumulator lever 6 can be controlled by the rotary latch 2. For this purpose, the rotary latch 2 has a control stop **2*a* which controls the accumulator lever 6. The accumulator lever 6 in turn has a control projection 6*a*. The control stop 2*a* on the rotary latch 2 can interact with the control projection 6*a* on the accumulator lever 6 when an accumulator position of the accumulator lever 6, which is to be described in more detail below, and consequently of the pawl 3 is to be released, as will be explained in more detail below and becomes clear with reference to FIGS. 2 and 3**.

Figure 2:
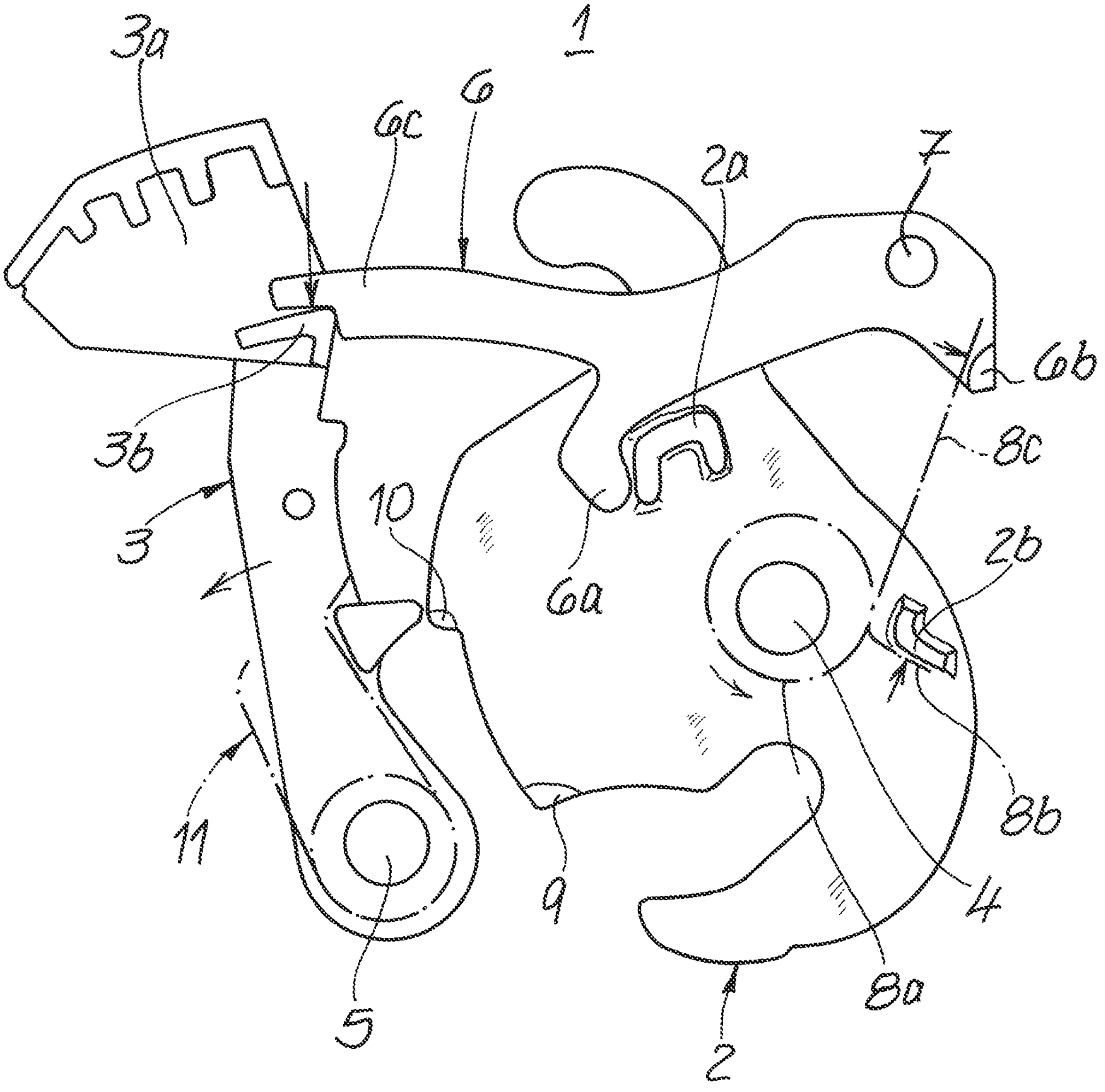
FIG. 2 shows the object according to FIG. 1 in the accumulator position or the open position of the pawl.
Figure 3:
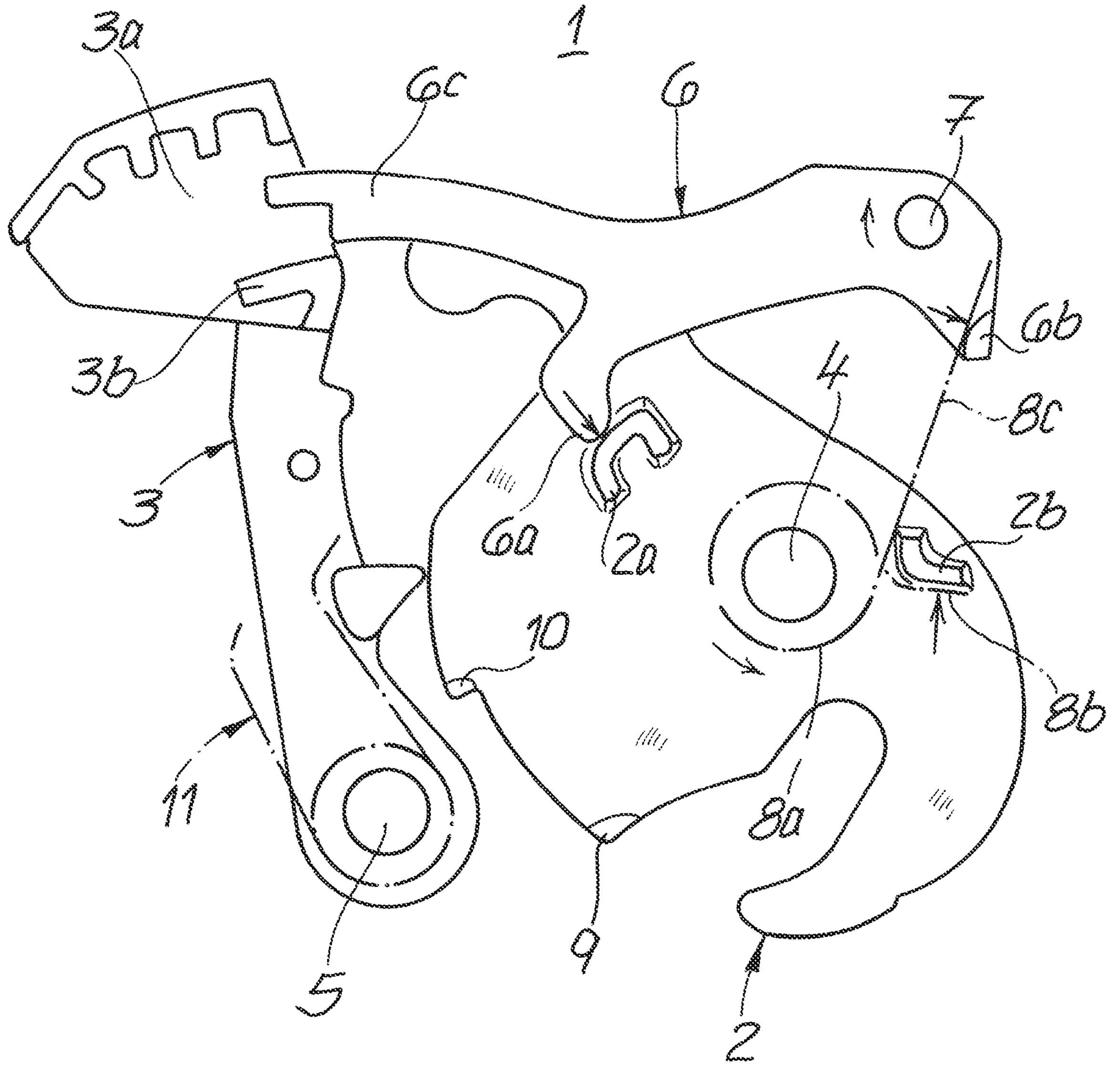
FIG. 3 shows the transition from the accumulator position according to FIG. 2 and the release of the accumulator position.

The accumulator lever 6 that is controllable by the rotary latch 2 ensures that at least during an opening process of the locking mechanism 2, 3, the pawl 3 is temporarily held in its open position, the accumulator position. This accumulator position is shown in FIG. 2, whereas FIG. 3 represents the release of the accumulator position.

According to the invention, a common spring 8*a*, 8*b* and 8*c* acting on the rotary latch 2 and the accumulator lever 6 is now realized. The spring 8*a, b* and 8*c* is a leg spring with a wound section 8*a* and two spring legs 8*b* and 8*c*. The spring 8*a*, 8*b*, 8*c* is connected by its wound section 8*a* to the rotary latch 2. In fact, the wound section 8*a* of the spring 8*a*, 8*b*, 8*c* in question is arranged concentrically with respect to the axis 4 of the rotary latch 2 or of the rotary latch axis 4, as can best be seen in FIG. 1.

Overall, the design is such that the one spring leg 8*b* of the spring 8*a*, 8*b*, 8*c* is designed as a rotary latch spring leg 8*b* acting on the rotary latch 2. In contrast, the further second spring leg 8*c* is an accumulator lever spring leg 8*c* which acts on the accumulator lever 6. Here, the respective spring leg 8*b*, 8*c* rests against a rotary latch stop 2*b* or an accumulator lever stop 6*b*.

In fact, the design is such that the rotary latch spring leg 8*b* rests predominantly radially or in the radial direction R on the rotary latch stop 2*b* in relation to the axis 4 of the rotary latch 2. In other words, the rotary latch spring leg 8*b* and the rotary latch stop 2*b* extend predominantly in the radial direction R indicated in FIG. 1 in relation to the axis 4 of the rotary latch 2 or rotary latch axis 4. In contrast, the accumulator lever spring leg 8*c* rests against the accumulator lever stop 6*b* largely tangentially in relation to the axis 4 of the rotary latch 2. In other words, the accumulator lever spring leg 8*c* and the accumulator lever stop 6*b* extend largely in the tangential direction T likewise shown in FIG. 1 in relation to the axis 4 of the rotary latch 2 or rotary latch axis 4.

In this way, the rotary latch spring leg 8*b* can exert a force on the rotary latch 2, indicated by an arrow in FIG. 1, that is predominantly perpendicular to the radial direction R in relation to the axis 4 of the rotary latch 2, so that a torque acting on the axis 4 in the counterclockwise direction results therefrom. This torque in the counterclockwise direction ensures that the rotary latch 2 is acted upon in the opening direction about its axis 4, i.e. in the counterclockwise direction, as can be seen from the sequence of FIGS. 1 to 3.

The mostly tangential abutment of the accumulator lever spring leg 8*c* on the accumulator lever stop 6*b* has the result with respect to the accumulator lever 6 that said lever is also acted upon by a force indicated by an arrow in FIG. 1, which ensures that the accumulator lever 6 is acted upon with a torque likewise acting in the counterclockwise direction in relation to its axis 7. As a result, the common spring 8*a*, 8*b*, 8*c* not only ensures that the rotary latch 2 is acted upon in its opening direction, but additionally the accumulator lever 6 with its control projection 6*a* undergoes the desired spring action in the direction of the control stop 2*a* on the rotary latch 2.

The mode of operation is as follows. FIG. 1 shows the closed state of the locking mechanism 2, 3. In this closed state, the pawl 3 interacts with a main ratchet 9 of the rotary latch 2. In addition to the main ratchet 9, the rotary latch 2 also has a pre-ratchet 10. In principle, however, it is also possible to work with only one of these two ratchets 9, 10 on the rotary latch 2. In the illustrated closed position of the locking mechanism 2, 3 according to FIG. 1, the accumulator lever 6 engages in a recess 3*a* of the pawl 3. In addition, it can be seen that the accumulator lever 6 rests with an extension arm 6*c* against a stop 3*b* on the pawl 3.

This is ensured by a force indicated by an arrow. This force results from the fact that the accumulator lever spring leg 8*c* acts on the accumulator lever stop 6*b* in the force direction likewise indicated in FIG. 1 and thus ensures a (slight) torque in the counterclockwise direction relative to the axis 7 of the accumulator lever 6.

Starting from the closed position or main locking position according to FIG. 1, the locking mechanism 2, 3 can now be opened. To this end, a release lever (not expressly shown), which is acted upon by a motor and/or manually, may ensure that the pawl 3 is moved counterclockwise about its axis or pawl axis 5 starting from the position according to FIG. 1. As a result, the pawl 3 reaches the position shown in FIG. 2 and has been lifted away from the rotary latch 2. This position of the pawl 3 is assumed and maintained against a pawl spring 11 that pretensions the pawl 3 in the direction of the rotary latch 2. This is ensured by the accumulator lever 6 which holds the pawl 3 lifted away from the rotary latch 2 in its open position shown in FIG. 2. This corresponds to the accumulator position of the pawl 3 or of the accumulator lever 6. In this accumulator position, an extension arm 6*c* of the accumulator lever 6 strikes the stop 3*b* of the pawl 3 or overlaps this stop, as can be seen from FIG. 2. Since the accumulator lever 6 is provided with the torque acting in the counterclockwise direction about its axis 7 due to the force built up by the accumulator lever spring leg 8*c*, the extension arm 6*c* of the accumulator lever 6 is to held at the stop 3*b* on the pawl 3. In this accumulator position or open position of the pawl 3, the rotary latch 2 can pivot open in the opening direction, specifically without the pawl 3 being able to latch with the rotary latch 2. In other words, both the main ratchet 9 and the pre-ratchet 10 of the rotary latch 2 each move along the pawl 3. In this case, the rotary latch 2 is acted upon in the counterclockwise direction about the axis 4 by means of the rotary latch spring leg 8*b*.

In the transition from FIG. 2 to FIG. 3, it can be seen that, in the accumulator position according to FIG. 2, the control projection 6*a* on the accumulator lever 6 is moved against the control stop 2*a* on the rotary latch or the control stop 2*a* on the opening rotary latch 2 has moved in the direction of the control projection 6*a* on the accumulator lever 6. As soon as the rotary latch 2 with its pre-ratchet 10 has passed the pawl 3, an interaction arises between, on the one hand, the control stop 2*a* on the rotary latch 2 opening counterclockwise around its axis 4 and, on the other hand, the control projection 6*a* on the accumulator lever 6.

This has the consequence that, during the transition from FIG. 2 to FIG. 3, the control projection 6*a* on the accumulator lever 6 moves along the ramp-like control stop 2*a* on the rotary latch 2, so that the accumulator lever 6 is thereby pivoted clockwise about its axis 7 during the transition from FIG. 2 to FIG. 3. As a result, the extension arm 6*c* on the accumulator lever 6 is released from the stop 3*b* on the pawl 3 and this process ensures that the accumulator position according to FIG. 2 of the pawl 3 or of the accumulator lever 6 is released.

Following this, the pawl 3 can be supported on the outer circumference of the now fully open rotary latch 2. A locking pin (not explicitly shown) previously caught by the rotary latch 2 is released. The pawl spring 11 ensures the contact of the pawl 3 on the outer circumferential side of the rotary latch 2.

| List of reference signs | |
|---|---|
| 1 | Lock case |
| 2, 3 | Locking mechanism |
| 2 | Rotary latch |
| 3 | Pawl |
| 4, 7, 5 | Axes |
| 4 | Rotary latch axis |
| 5 | Pawl axis |
| 7 | Axis |
| 6 | Accumulator lever |
| 6a | Control projection |
| 6b | Accumulator lever stop |
| 6c | Extension arm |
| 8a, 8b, 8c | Spring |
| 8a | Wound section |
| 8b | Rotary latch spring leg |
| 8c | Accumulator lever spring leg |
| 9, 10 | Catches |
| 9 | Main catch |
| 10 | Pre-ratchet |
| 11 | Pawl spring |
| R | Radial direction |
| T | Tangential direction |

The invention claimed is:

1. A motor vehicle lock comprising:

a locking mechanism including a rotary latch and a pawl, an accumulator lever that is controlled by the rotary latch, wherein the rotary latch temporarily holds the pawl in an open accumulator position at least during an opening process of the locking mechanism, and a spring configured to directly engage both the rotary latch and the accumulator lever, wherein the rotary latch includes a control stop and a rotary latch stop, wherein the spring directly acts on the rotary latch stop, and wherein the control stop engages the accumulator lever when a pre-ratchet on the rotary latch has passed an engagement on the pawl to release the pawl from the open accumulator position.

2. The motor vehicle lock according to claim 1, wherein the spring is a leg spring with a wound section and two spring legs.

3. The motor vehicle lock according to claim 2, wherein the spring is connected by the wound section to the rotary latch.

4. The motor vehicle lock according to claim 3, wherein the wound section of the spring is arranged concentrically with a rotational axis of the rotary latch.

5. The motor vehicle lock according to claim 2, wherein one spring leg of the two spring legs is a rotary latch spring leg directly acting on the rotary latch stop and another spring leg of the two spring legs is an accumulator lever spring leg directly acting on the accumulator lever.

6. The motor vehicle lock according to claim 5, wherein the accumulator spring leg rests against an accumulator lever stop of the accumulator lever.

7. The motor vehicle lock according to claim 6, wherein the rotary latch spring leg rests against the rotary latch stop generally radially in relation to a rotational axis of the rotary latch.

8. The motor vehicle lock according to claim 6, wherein the accumulator lever spring leg rests against the accumulator lever stop generally tangentially in relation to a rotational axis of the rotary latch.

9. The motor vehicle lock according to claim 1, wherein the rotary latch, the accumulator lever, and the pawl are mounted in a housing on different axes spaced apart from each other.

10. The motor vehicle lock according to claim 9, wherein the different axes are parallel to each other.

11. The motor vehicle lock according to claim 1, wherein in a closed position of the locking mechanism, the accumulator lever engages in a recess in the pawl, and the accumulator lever further has an extension arm that engages against a stop in the pawl in the closed position.

12. The motor vehicle lock according to claim 11, wherein in the open accumulator position, the extension arm of the accumulator lever acts on the stop of the pawl to build up tension in the spring.

13. The motor vehicle lock according to claim 1, wherein during an opening process of the locking mechanism, an extension arm of the accumulator lever engages a stop of the pawl to space the pawl from the rotary latch until the rotary latch reaches a rotary latch open position where the control stop on the rotary latch engages the accumulator lever to disengage the extension arm from the stop of the pawl.

14. A motor vehicle lock comprising:

a locking mechanism including a rotary latch and a pawl, an accumulator lever that is controlled by the rotary latch, wherein the rotary latch temporarily holds the pawl in an open accumulator position at least during an opening process of the locking mechanism, and a spring acting on both the rotary latch and the accumulator lever, wherein the spring is a leg spring with a wound section and two spring legs, wherein one spring leg of the two spring legs is a rotary latch spring leg acting on the rotary latch and another spring leg of the two spring legs is an accumulator lever spring leg acting on the accumulator lever, and wherein the rotary latch spring leg rests against a rotary latch stop of the rotary latch, and the accumulator spring leg rests against an accumulator lever stop of the accumulator lever, wherein the rotary latch further includes a control stop, and wherein the control stop engages the accumulator lever when a pre-ratchet on the rotary latch has passed an engagement on the pawl to release the pawl from the open accumulator position.

15. A motor vehicle lock comprising:

a locking mechanism including a rotary latch and a pawl, an accumulator lever that is controlled by the rotary latch, wherein the rotary latch temporarily holds the pawl in an open accumulator position at least during an opening process of the locking mechanism, and a spring acting on both the rotary latch and the accumulator lever, wherein the spring is a leg spring with a wound section and two spring legs, wherein the spring is connected by the wound section to the rotary latch, and wherein the wound section of the spring is arranged concentrically with a rotational axis of the rotary latch.

* * * * *